United States Patent
Lin et al.

(10) Patent No.: US 12,056,847 B2
(45) Date of Patent: Aug. 6, 2024

(54) IMAGE PROCESSING METHOD, MEANS, ELECTRONIC DEVICE AND STORAGE MEDIUM

(71) Applicant: Alibaba Group Holding Limited, George Town (KY)

(72) Inventors: Xianhui Lin, Shenzhen (CN); Xiaoming Li, Shenzhen (CN); Chaofeng Chen, Shenzhen (CN); Xuansong Xie, Beijing (CN); Peiran Ren, Hangzhou (CN)

(73) Assignee: Alibaba Group Holding Limited (KY)

( * ) Notice: Subject to any disclaimer, the term of this patent is extended or adjusted under 35 U.S.C. 154(b) by 488 days.

(21) Appl. No.: 17/366,484

(22) Filed: Jul. 2, 2021

(65) Prior Publication Data

US 2022/0020130 A1    Jan. 20, 2022

(30) Foreign Application Priority Data

Jul. 6, 2020    (CN) .......................... 202010639623.9

(51) Int. Cl.
*G06T 5/50*    (2006.01)
*G06N 5/022*    (2023.01)
(Continued)

(52) U.S. Cl.
CPC .............. *G06T 5/50* (2013.01); *G06N 5/022* (2013.01); *G06T 5/73* (2024.01); *G06T 7/11* (2017.01);
(Continued)

(58) Field of Classification Search
CPC ... G06T 5/50; G06T 5/003; G06T 7/11; G06T 7/13; G06T 7/33; G06T 2207/20036;
(Continued)

(56) References Cited

U.S. PATENT DOCUMENTS 8,885,976 B1    11/2014    Kuo
9,406,122 B2     8/2016    Hladuvka
(Continued)

FOREIGN PATENT DOCUMENTS

CN    107595387    1/2018
CN    107977971    5/2018
(Continued)

OTHER PUBLICATIONS

Chen H. et al. (2015) Automatic Localization and Identification of Vertebrae in Spine CT via a Joint Learning Model with Deep Neural Networks. In: Navab N., Hornegger J., Wells W., Frangi A. (eds) Medical Image Computing and Computer-Assisted Intervention—MICCAI 2015. MICCAI 2015. Lecture Notes in Computer Science, vol. 9349. Springer, Cham. https://doi.org/10.1007/978-3-319-24553-9_63.
(Continued)

*Primary Examiner* — Charles T Shedrick
(74) *Attorney, Agent, or Firm* — Van Pelt, Yi & James LLP

(57) ABSTRACT

The present application discloses a method, device, and system for processing a medical image. The method includes obtaining a first image corresponding to a to-be-processed image, obtaining a second image corresponding to the to-be-processed image, wherein the first image and the second image are obtained in response to an image degradation processing being performed with respect to the to-be-processed image, and an image quality of the first image and an image quality of the second image are different. The method further includes obtaining image structural information corresponding to the to-be-processed image, and performing an image fusion processing with respect to the first image and the second image to image fusion based at least in part on the image structural information corresponding to (Continued)

the to-be-processed image, wherein a target image is obtained based at least in part on the image fusion processing, and the target image corresponds to the to-be-processed image.

18 Claims, 6 Drawing Sheets

(51) Int. Cl.
    *G06T 5/73* (2024.01)
    *G06T 7/11* (2017.01)
    *G06T 7/13* (2017.01)
    *G06T 7/33* (2017.01)

(52) U.S. Cl.
    CPC ............... *G06T 7/13* (2017.01); *G06T 7/33* (2017.01); *G06T 2207/20036* (2013.01); *G06T 2207/20081* (2013.01); *G06T 2207/20221* (2013.01); *G06T 2207/30004* (2013.01); *G06T 2207/30168* (2013.01)

(58) Field of Classification Search
    CPC . G06T 2207/20081; G06T 2207/20221; G06T 2207/30004; G06T 2207/30168; G06T 5/30; G06N 5/022
    See application file for complete search history.

(56) References Cited

U.S. PATENT DOCUMENTS

| | | | |
|---|---|---|---|
| 9,558,543 | B2 | 1/2017 | Hsieh |
| 9,916,655 | B2 | 3/2018 | Stampanoni |
| 10,002,407 | B1* | 6/2018 | Mercer ............... G06T 3/40 |
| 11,538,139 | B2* | 12/2022 | Jee ..................... G06T 5/20 |
| 2002/0150304 | A1* | 10/2002 | Ockman ............... G06T 5/50 |
| | | | 382/286 |
| 2006/0098897 | A1 | 5/2006 | Dewaele |
| 2011/0058720 | A1 | 3/2011 | Lu |
| 2011/0064327 | A1* | 3/2011 | Dagher ............... G06T 5/50 |
| | | | 382/284 |
| 2011/0194788 | A1* | 8/2011 | Chaudhuri ........... G06T 11/00 |
| | | | 382/284 |
| 2017/0076430 | A1 | 3/2017 | Xu |
| 2018/0068473 | A1* | 3/2018 | Tico .................... G06T 11/60 |
| 2018/0316864 | A1 | 11/2018 | Molgaard |
| 2019/0005660 | A1 | 1/2019 | Kinoshita |
| 2019/0147589 | A1* | 5/2019 | Zhou .................. G06F 18/241 |
| | | | 382/131 |
| 2020/0151938 | A1* | 5/2020 | Shechtman .......... G06N 3/045 |
| 2020/0364838 | A1* | 11/2020 | Liu .................... G06F 16/9024 |
| 2022/0198723 | A1* | 6/2022 | Lin .................... G06V 10/44 |

FOREIGN PATENT DOCUMENTS

| | | |
|---|---|---|
| CN | 108038860 | 5/2018 |
| CN | 105433988 | 10/2018 |
| CN | 109360213 | 2/2019 |
| CN | 109493317 | 3/2019 |
| CN | 109523523 | 3/2019 |
| EP | 2639763 B1 | 10/2015 |
| EP | 3005289 | 7/2017 |
| WO | 2020199528 | 10/2020 |
| WO | 2021017297 | 2/2021 |

OTHER PUBLICATIONS

Neubert et al. Automated Detection, 3D Segmentation and Analysis of High Resolution Spine MR Images Using Statistical Shape Models. Published Nov. 30, 2012 · © 2012 Institute of Physics and Engineering in Medicine. Physics in Medicine & Biology, vol. 57, No. 24: DOI: 10.1088/0031-9155/57/24/8357.

* cited by examiner

IMAGE PROCESSING METHOD, MEANS, ELECTRONIC DEVICE AND STORAGE MEDIUM

CROSS REFERENCE TO OTHER APPLICATIONS

This application claims priority to People's Republic of China Patent Application No. 202010639623.9 entitled AN IMAGE PROCESSING METHOD, MEANS, ELECTRONIC DEVICE AND STORAGE MEDIUM filed Jul. 6, 2020 which is incorporated herein by reference for all purposes.

FIELD OF THE INVENTION

The present application relates to a field of computer technology. Specifically, the present application relates to an image processing method, electronic device, and storage medium.

BACKGROUND OF THE INVENTION

Image quality enhancement technology is an image processing technology that, through such methods as enhancing useful information in an image while removing from the image blurs and noise. Such image quality enhancement technology generally attains preset threshold values for improved image definition, resolution, etc., and thereby raises image quality. Image quality enhancement technology has a wide range of applications in various relevant contexts such as image transmission, image storage, image editing, and image presentation. Generally, implementation of image quality enhancement technology needs to be primarily based on a network model used for image quality enhancement. To obtain a network model used for image quality enhancement, a relatively large volume of high-quality sample images and of low-quality sample images corresponding to these high-quality sample images are needed as training samples to adequately train the network model used for image quality enhancement.

With the rapid development and upgrading of devices that capture high-quality image and the proliferation of such devices continues to increase the ways and contexts for obtaining high-quality sample images with ever greater convenience. Currently, obtaining a large volume of low-quality sample images corresponding to high-quality sample images often requires that the high-quality sample images undergo image degradation processing.

The current image degradation processing method is generally as follows: for a large volume of high-quality images that are to be degraded, an overall unified approach is adopted to generate low-quality images corresponding to the high-quality images. This approach often suffers from the problem of poor fidelity of the low-quality images as a result of the relatively unvaried image structural information of the different low-quality images.

BRIEF DESCRIPTION OF THE DRAWINGS

Various embodiments of the invention are disclosed in the following detailed description and the accompanying drawings.

DETAILED DESCRIPTION

Figure 1:
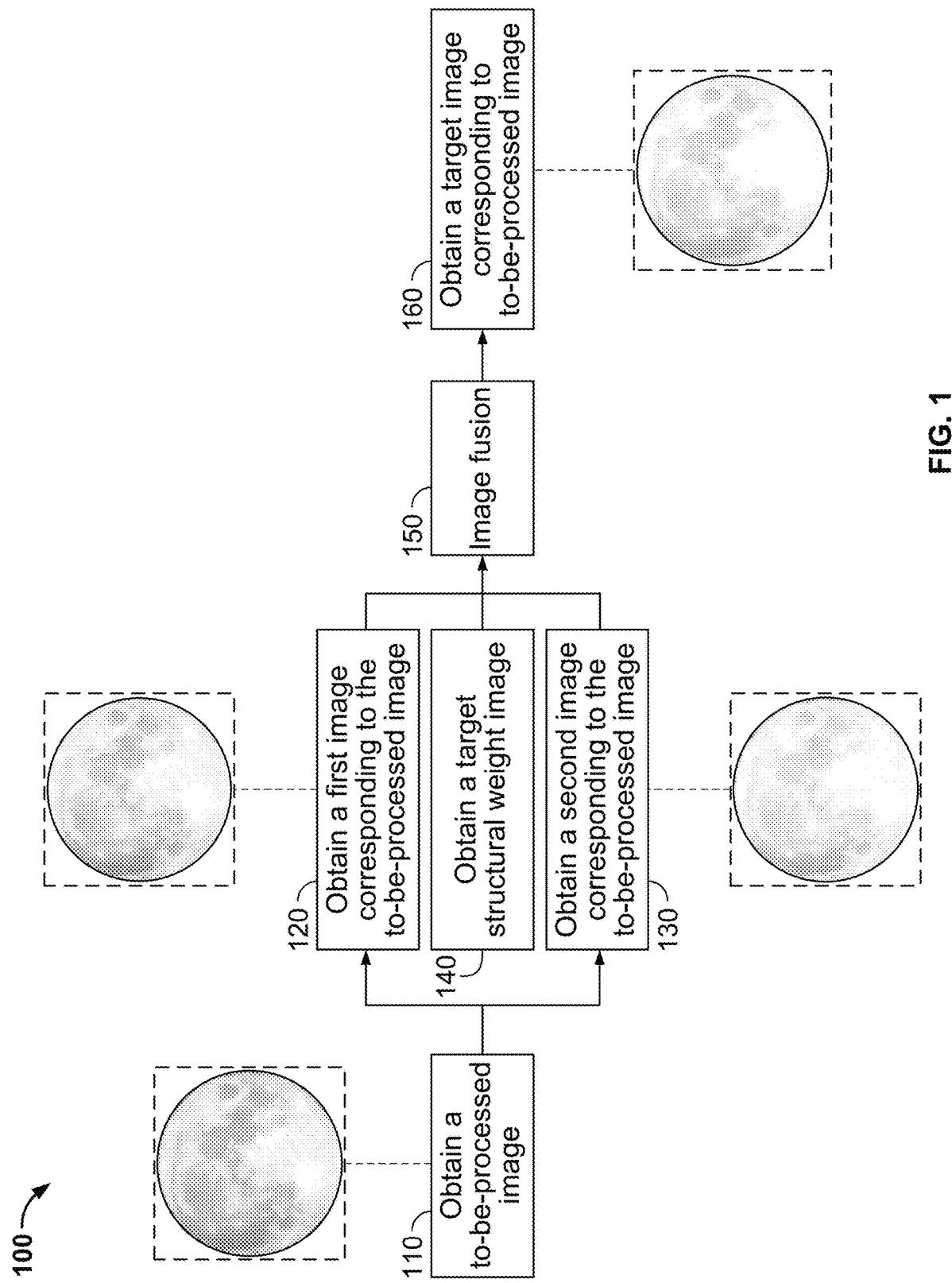
FIG. 1 is a diagram of an application scenario of an image processing method according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The descriptions below set forth many particular details for a full understanding of the present application. However, the present application can be implemented in many ways other than those described here. A person skilled in the art may extend it similarly without violating the meaning of the present application. Therefore, the present application is not limited by the specific embodiments disclosed below.

As used herein, a "terminal" generally refers to a device comprising one or more processors. A terminal may also be referred to herein as a user equipment (UE). A terminal may be a device used (e.g., by a user) within, or connected to, a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), a mobile medical device, a camera, a wearable device (e.g., a Head-Mounted Device (HIVID), electronic clothes, electronic braces, an electronic necklace, an electronic accessory, an electronic tattoo, or a smart watch), a kiosk such as a vending machine, a smart home appliance, vehicle-mounted mobile stations, a door lock, a water meter, or an electricity meter, or the like. The terminal may be implemented as an Internet of Things (IoT) device. A terminal may run various operating systems.

According to various embodiments, an image processing method is used in connection with subjecting high-quality images to image degradation processing to obtain low-quality images that have relatively high image fidelity. The high-quality images and low-quality images are images in relation to a specified image quality threshold. The specified image quality threshold corresponding to a high quality image and/or the specified image quality threshold may be configurable based by a user, administrator, etc. As an example, the specified image quality threshold corresponding to a high quality image and/or the specified image quality threshold may be configurable based on user preferences, organization preferences, etc. Images having an image quality attains (e.g., is equal to or exceeds) the specified image quality threshold are deemed to be high-quality images, and images having an image quality that fails to attain (e.g., that is less than) the specified image quality threshold are deemed to be low-quality images. "Image quality" is an evaluation of the visual effects of an image and is used to characterize the definition, resolution, and other aspects of an image. In some embodiments, the image quality may be based at least in part on one or more predefined image characteristics, and the specified image quality threshold may be a measure with respect to at least one of the image characteristics used to determine an image quality of an image.

FIG. 1 is a first diagram of an application scenario of an image processing method according to various embodiments of the present application.

Referring to FIG. 1, process 100 may be implemented by a terminal. For example, process 100 may be implemented by an image capturing device such as a mobile phone, a tablet, etc. As another example, process 100 may be implemented in connection with medical imaging (e.g., by a terminal or server associated with processing images captured by a medical device such as an x-ray, an magnetic resonance imaging (MM), etc.). Process 100 may be implemented in connection with other imaging/image capturing technologies.

At 110, a to-be-processed image is obtained. As used herein, a to-be-processed image is also referred to as a source image. In some embodiments, a server obtains the source image. For example, the server may be obtained based on an input corresponding to a user selection (e.g., an input to a client terminal and sent to the server). The source image may be uploaded to the server. The server may host a web-service such as an image-processing service. In some embodiments, a terminal obtains the source image. For example, a mobile terminal may obtain the source image in response a user selection. The source image may be obtained in response to image capture using a camera application, etc.

According to various embodiments, the source image is a high-quality image. For example, the source image has an image quality is higher than (or equal to) a specified image quality threshold. The source image may be an image that is identified or selected to undergo image processing.

At 120, a first image is obtained. The first image may correspond to the to-be-processed image. According to various embodiments, the "first image" is an image obtained after the to-be-processed image undergoes image degradation processing. The first image may be obtained by a terminal or a server, etc. As an example, the first image may be obtained by the same device that obtains the to-be-processed image.

In some embodiments, the obtaining the first image includes determining an image quality of the first image, and performing an image degradation processing on the to-be-processed image. The image degradation processing performed with respect to the to-be-processed image may be based at least in part on the image quality of the first image so as to obtain the first image. In some embodiments, the image quality degradation processing may include: adding interference information to the to-be-processed image (e.g., adding noise to the to-be-processed image). In some embodiments, image quality degradation processing may include removing effective information from the to-be-processed image. As an example, the removing the effective information from the to-be-processed image may include changing the pixel values of some pixels in the to-be-processed image in order to lower the definition of some image regions. In some embodiments, the image quality of the first image is a preset parameter. For example, the image quality of the first image may be set based on a preference of a user, administrator, organization, etc. In some embodiments, the image degradation is performed based at least in part on the quality of the first image in connection with converting the source image (e.g., the to-be-processed image) to the first image having the desired image quality.

According to various embodiments, the obtaining the first image includes performing image degradation processing on the to-be-processed image to obtain a desired image quality of the first image. For example, the image quality of the first image may be identified or selected, and an image degradation processing may be performed with respect to the source image to obtain the first image, and the first image may have an image quality corresponding to the desired image quality.

At 130, a second image is obtained. The second image may correspond to the to-be-processed image. According to various embodiments, the "second image" is an image obtained after the to-be-processed image undergoes image degradation processing. The second image may be obtained by a terminal or a server, etc. As an example, the second image may be obtained by the same device that obtains the to-be-processed image.

In some embodiments, the obtaining the second image includes determining an image quality of the second image, and performing an image degradation processing on the to-be-processed image. The image degradation processing performed with respect to the to-be-processed image may be based at least in part on the image quality of the second image so as to obtain the second image. The image quality of the second image may correspond to a desired image quality for the quality image. In some embodiments, the image quality of the second image is a preset parameter. For example, the image quality of the second image may be set based on a preference of a user, administrator, organization, etc.

In some embodiments, the image quality of the first image is different from the image quality of the second quality. For example, the image quality of the first image and/or the image quality of the second image may be selected or defined in order to be different from one another. In some embodiments, the image quality of the first image is the same as the image quality of the second quality.

According to various embodiments, the image quality of the first image is the same as the image quality of the second quality, and the image degradation performed with respect to the source image to obtain the first image and image degradation performed with respect to the source image to obtain the second image are different.

At 140, a target structural weight image is obtained. According to various embodiments, the "target structural weight image" is a weight image for characterizing image structural information corresponding to multiple target image regions. In some embodiments, the target structural weight image comprises different weights associated with different parts of the corresponding image. For example, predefined portions of the image may have a corresponding associated weighting associated with the portions. Weightings may be associated on a pixel-by-pixel basis, or according to another set of predefined portions. The target structure weight image may be obtained by a terminal or a server, etc. As an example, the target structural weight image may be obtained by the same device that obtains the to-be-processed image, the first image, and/or the second image. As another example, the source image is partitioned into a plurality of partitions, and each partition is assigned a corresponding weighting.

The weights in the target structure weight image may correspond to target weights for characterizing image structural information corresponding to the multiple target image regions. The image structural information corresponding to the to-be-processed image may be an information set of image edge feature information of the to-be-processed image and image definition feature information of the corresponding image. The image structural information corresponding to multiple target image regions may be the image structural information of the region images corresponding to each target image region after the to-be-processed image is partitioned into the specified multiple target image regions. The "target structural weight image" may a weight image that is generated based at least in part on the weights for characterizing image structural information corresponding to the multiple target image regions and that corresponds to the to-be-processed image.

The image edge feature information may be obtained based performing an edge detection with respect to the image. For example, a phase stretch transform may be performed with respect to the image, a fuzzy-edge based feature matching may be performed, etc. In connection with performing the edge detection, the image may be processed using various tools such as a curve-fitting model, a moment based model, a reconstructive model, and a partial area effect model. Various edge detection models or tools may be implemented in connection with the image edge feature information. Various feature extraction models or tools may be implemented in connection with the image edge feature information image definition feature information of the corresponding image.

According to various embodiments, the target image structural weight image can characterize both image edge feature information and image definition feature information corresponding to multiple target image regions of an image. For example, the target image structural weight image can characterize both image edge feature information and image definition feature information corresponding to multiple target image regions based at least in part on the image structural and the target structural weight information. The image structural information may be an information set of image edge feature information of the to-be-processed image and image definition feature information of the image, and the target structural weight image may be a weight image that is generated from the weights for characterizing image structural information corresponding to the multiple target image regions and that corresponds to the to-be-processed image, The weights in the target structural weight image may be used in connection with characterizing image structural information of each target image region of multiple target image regions. For example, the weights in the target structural weight image may be used in connection with characterizing image edge feature information and image definition feature information corresponding to each target image region of the multiple target image regions. In some embodiments, the greater the weights in the target structural weight image, the more obvious is the image structure of each target image region. For example, the greater the weights in the target structural weight image the more the region image corresponding to each target image region is positioned at an edge and the sharper such region image is presented. As another example, the greater the weight corresponding to a part of the image (e.g., the source image), the more emphatic such a part of the image is in comparison to another part of the image having a weight of lesser value.

According to various embodiments, 120, 130, and 140 of process 100 of FIG. 1 are performed contemporaneously. For example, one or more of 120, 130, and 140 may be performed in parallel. As another example, one or more of 120, 130, and 140 may be performed serially.

Figure 2:
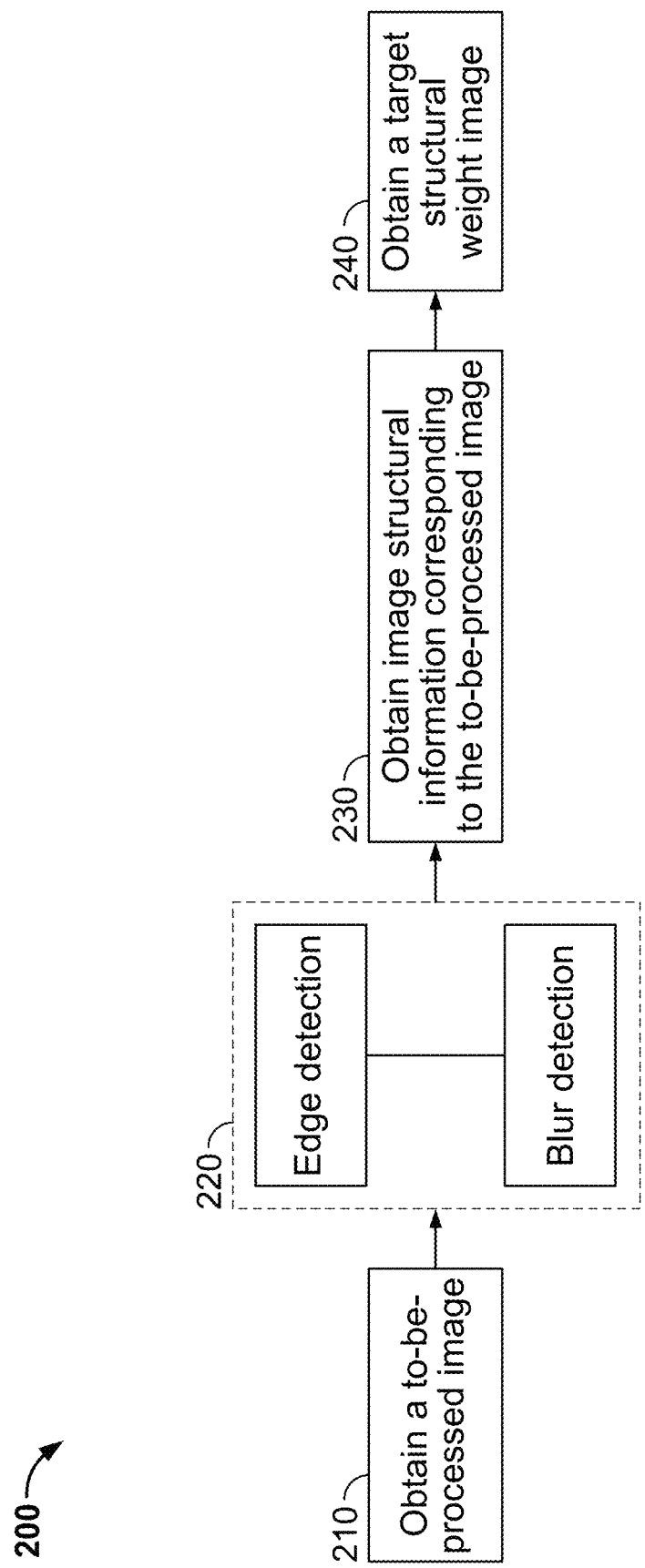
FIG. 2 is a diagram of an application scenario of the image processing method according to various embodiments of the present application.

FIG. 2 is a diagram of an application scenario of the image processing method according to various embodiments of the present application. According to various embodiments, process 200 of FIG. 2 may be implemented in connection with process 100 of FIG. 1. For example, process 200 may correspond to 140 of process 100.

Referring to FIG. 2, process 200 may be implemented by a terminal. For example, process 200 may be implemented by an image capturing device such as a mobile phone, a tablet, etc. As another example, process 200 may be implemented in connection with medical imaging (e.g., by a terminal or server associated with processing images captured by a medical device such as an x-ray, an magnetic resonance imaging (MM), etc.). As another example, process 200 may be implemented in connection with processing a satellite image, etc. Process 200 may be implemented in connection with other imaging/image capturing technologies.

At 210, an image to be processed is obtained. In some embodiments, a server obtains the source image. For example, the server may be obtained based on an input corresponding to a user selection (e.g., an input to a client terminal and sent to the server). The source image may be uploaded to the server. The server may host a web-service such as an image-processing service. In some embodiments, a terminal obtains the source image. For example, a mobile terminal may obtain the source image in response a user selection. The source image may be obtained in response to image capture using a camera application, etc. The source image may be obtained from a local storage of a terminal, server, etc.

At 220, an edge detection processing and a blur detection processing are performed. In some embodiments, the edge detection processing and the blur detection processing are performed as a single processing. In some embodiments, the edge detection processing and the blur detection processing are performed as a different processing, such as by different modules or sub-modules. The edge detection and the blur detection may be performed serially.

The edge detection and the blur detection are performed on the to-be-processed image. According to various embodiments, in response to performing the edge detection processing and the blur detection processing, image edge feature information corresponding to the multiple target image regions (e.g., of the source image) is obtained; and image definition feature information corresponding to the multiple target image regions (e.g., of the source image) is obtained.

At 230, image structural information corresponding to the to-be-processed image is obtained. In some embodiments, the image structural information is obtained by a terminal or server based at least in part on results of the edge detection processing and the blur detection processing. For example, image structural information corresponding to the multiple target image regions may be obtained based at least in part on the image edge feature information corresponding to the multiple target image regions and the image definition feature information corresponding to the multiple target image regions serve.

At 240, a target structural weight image is obtained. In some embodiments, the obtaining the target structural weight image comprises, for each of a plurality of target image regions: obtaining region edge feature values, obtaining the region definition feature values, determining an image edge feature value image, obtaining an image definition feature value image, determining an initial structural weight image, obtaining a second structural weight image for characterizing image structural information, and normalizing the weights in the second structural weight image, and obtaining a target structural weight image.

Figure 3:
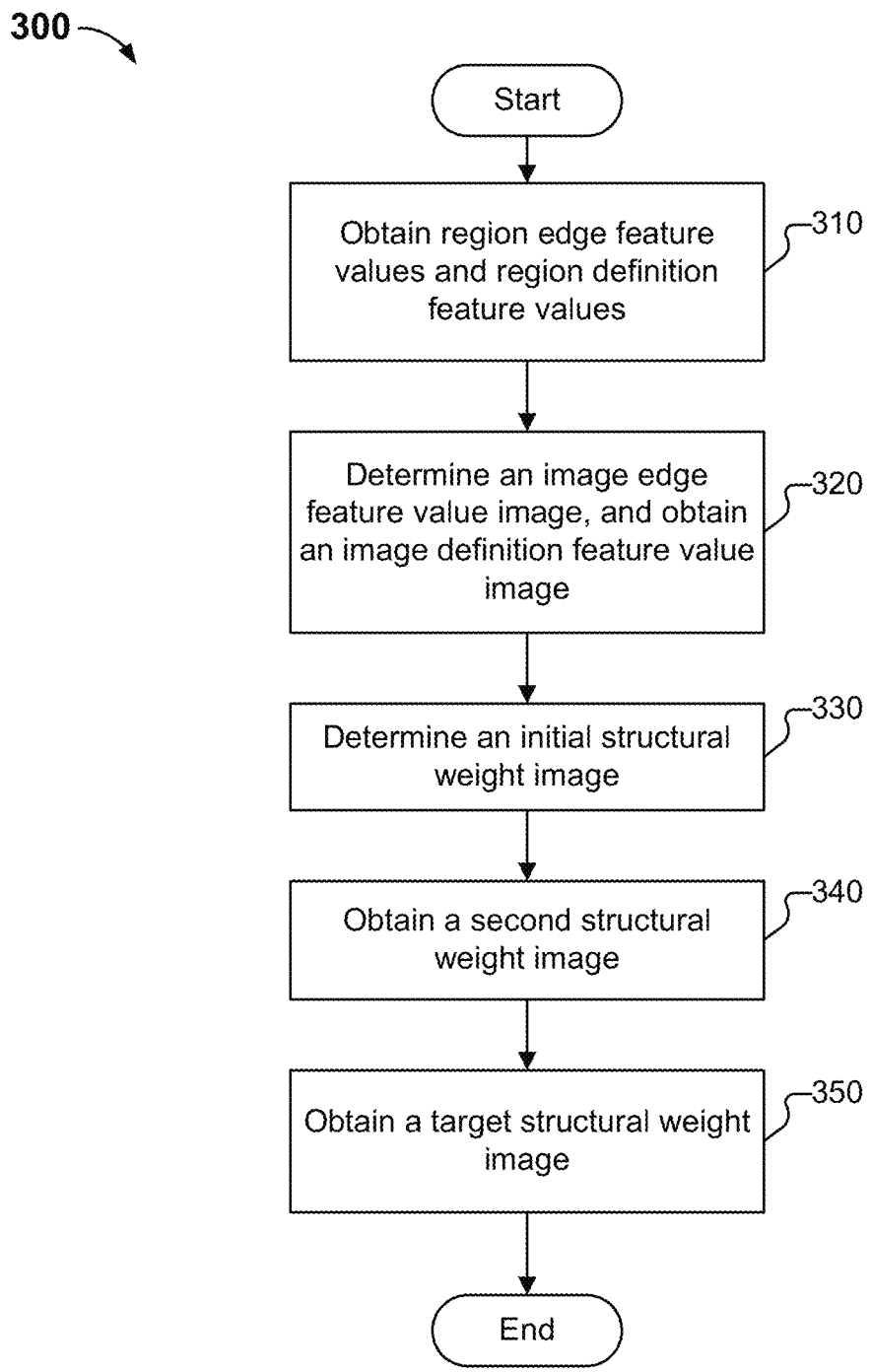
FIG. 3 is a diagram of an application scenario of the image processing method according to various embodiments of the present application.

FIG. 3 is a diagram of an application scenario of the image processing method according to various embodiments of the present application. According to various embodiments, process 300 may be implemented in connection with obtaining a target structural weight image. For example, process 300 of FIG. 3 may correspond to 240 of process 200 of FIG. 3.

At 310, region edge feature values and region definition feature values are obtained. In some embodiments, region edge feature values and region definition feature values are obtained for a plurality of regions of an image (e.g., the source image).

According to various embodiments, region edge feature values for characterizing image edge feature information corresponding to each target image region are obtained, and region definition feature values for characterizing image definition feature information corresponding to each target image region are obtained. The region edge feature values may correspond to feature values that are obtained in response to a unified value assignment being performed with respect to image edge feature information corresponding to multiple target region images. The region edge feature values may be used in connection with characterizing the degree of edginess of the multiple target region images in the to-be-processed image. As an example, the greater the region edge feature value, the greater the extent to which the target region image corresponding to the region edge feature value is positioned at an edge in the to-be-processed image. As an example, the smaller the region edge feature value, the greater the extent to which the target region image corresponding to the region edge feature value is positioned in the center of the to-be-processed image. The region definition feature values for characterizing image definition feature information corresponding to each target image region may correspond to feature values that are obtained in response to performing a unified value assignment with respect to image definition feature information corresponding to multiple target region images. The region definition feature values may be used in connection with characterizing the definitions of the multiple target images. As an example, the greater the region definition feature value, the greater the definition of the target region image corresponding to the region definition feature value. As an example, the smaller the region definition feature value, the lower the definition of the target region image corresponding to the region definition feature value.

At 320, an image edge feature value image is determined, and an image definition feature value image is obtained. In some embodiments, the image edge feature value image and the image definition feature value image has the same dimensions as the target image. As an example, image feature values and image definition feature values may be obtained for a plurality of parts or regions of a target image (e.g., the source image). According to various embodiments, the region edge feature values and the region definition feature values serve as a basis to determine the image edge feature value image corresponding to the multiple target image regions and to obtain the image definition feature value image corresponding to the multiple target image regions. In some embodiments, because the region edge feature values and region definition feature values correspond to each target image region, if the region edge feature values and region definition feature values serve as a basis to determine image edge feature value images corresponding to multiple target image regions and to obtain image definition feature value images corresponding to the multiple target image regions, a feature value image that has the same dimensions as the to-be-processed image may be generated, and the feature value image may be partitioned into the same number of target regions as the to-be-processed image.

At 330, an initial structural image is determined. In some embodiments, the device determines the image structural image based at least in part on the image edge feature value image and the image definition feature value image first. The initial structural weight image may be used in connection with characterizing image structural information corresponding to the multiple target image regions.

At 340, a second structural weight image is obtained. According to various embodiments, the second structural weight image is used in connection with characterizing image structural information corresponding to the multiple target image regions. The second structural weight image for characterizing image structural information corresponding to the multiple target image regions may be obtained based at least in part on performing Gaussian blur processing and image morphological processing. For example, Gaussian blur calculations and image morphological calculations are performed on the initial image structural weight image. The Gaussian blur calculations may include convolutions performed on the initial structural value image with a normal distribution. The image morphological calculations may include expansion, corrosion, and other image processing performed on the initial structural weight image.

At 350, a target structural weight image is obtained. In some embodiments, the target structural weight image is obtained based at least in part on a normalization processing performed with respect to the weights in the second structural weight image. For example, the device (e.g., the terminal and/or server) performs a normalization processing with respect to weights in the second structural weight image to obtain a target structural weight image for characterizing image structural information corresponding to the multiple target image regions. The Normalization processing may correspond to the normalization of weights in the second structural weight image to between 0 and 1.

Returning to process 100 of FIG. 1, at 150, an image fusion is performed. According to various embodiments, the image fusion is performed based at least on the first image and the second image. For example, image fusion processing is performed with respect to the first image and the second image undergo image fusion based on the target structural weight image. The image fusion processing may include partitioning the first image and the second image, and performing a weighted average processing on the different partitions/regions of the first image and the second image.

In some embodiments, the first image and the second region are respectively partitioned. For example, the first image may be partitioned into multiple first image regions corresponding to the multiple target image regions. The first image may be partitioned based at least in part on the multiple target image regions. As another example, the second image may be partitioned into multiple second image regions corresponding to the multiple target image regions. In response partitioning the first image and the second image, a weighted average processing based on the target weights may be performed on the image structural information corresponding to the multiple first image regions and the image structural information corresponding to the multiple second image regions.

According to various embodiments, because the image structural information comprises an information collection of the image edge feature information of the image and the image clarity feature information of the image, and the target structure weight image is generated by the weight used to characterize the image structure information corresponding to multiple target image regions. The weighted image corresponding to the image to be processed, for example, the structural weighted image of the target image, may simultaneously represent the image edge feature information and the image sharpness feature information corresponding to multiple target image regions. The weight value in the target structure weight image may be used to characterize the image structure information of each target image area in the multiple target image areas. For example, the weight value in the target structure weight image may be used to characterize the image structure in the multiple target image areas. Image edge feature information and image sharpness feature information corresponding to each target image area. Among each target image area, the larger the weight in the target structure weight image, the more obvious the image structure of each target image area, for example, the more the area image corresponding to each target image area is at the edge, and the clearer the image of the area image.

At 160, a target image corresponding to the to-be processed image is obtained. According to various embodiments, the target image corresponds to the image obtained in response to the fusion processing performed with respect to the first image and the second image.

According to various embodiments, no specific restrictions are imposed on application scenarios of the methods of image processing described in the present application. In some embodiments, the image processing method may be used in a one-way work scenario wherein a server is solely used to provide services to clients. In some embodiments, the image processing method may be used in an interactive scenario between the clients and the server. These will not be further enumerated here. The "clients" are computing devices on which are installed programs or software used to execute the image processing method provided in embodiments of the present application.

Various embodiments may implement image processing methods in fields such as video applications, medicine, aerospace, and remote sensing technology. In the context of the field of video applications, according to various embodiments, an image processing method may be used to process video frames in order to obtain video frames of lower image quality and to treat the video frames together with video frames of higher image quality as input for training a target video frame quality enhancement model. The target video frame quality enhancement model may be a model used for video frame quality enhancement processing. After the target video frame quality enhancement model is trained, the target video frame quality enhancement model may be applied in video applications to enhance the image quality of video frames. The enhancing of the image quality of video frames may raise video playing definition. In the context of the field of medicine, according to various embodiments, an image processing method may be used to process medical images in order to obtain medical images of lower image quality and to treat the medical images together with medical images of higher image quality as input for training a target medical image quality enhancement model. The target medical image quality enhancement model may be a model used for medical image quality enhancement processing. After the target medical image quality enhancement model is trained, the target medical image quality enhancement model may be applied to enhance the image quality of medical images. The enhancing of the image quality of the medical images may raise the definition of medical images. In the context of the field of aerospace, according to various embodiments, an image processing method may be used to process satellite and remote sensing images in order to obtain satellite and remote sensing images of lower image quality and to treat the satellite and remote sensing images together with satellite and remote sensing images of higher image quality as input for training a target satellite and remote sensing image quality enhancement model. The target satellite and remote sensing image quality enhancement model may be a model used for satellite and remote sensing image quality enhancement processing. After the target satellite and remote sensing image quality enhancement model is trained, the target satellite and remote sensing image quality enhancement model may be applied to enhance the image quality of satellite and remote sensing images. The enhancing of the image quality of the satellite and remote sensing images may raise the definition of satellite and remote sensing images.

Various embodiments may be implemented in connection the software-as-a-service (SaaS) service approach to perform image processing services for relevant users. For example, software installed on a server or terminal that is connected to a client terminal via one or more networks may be used to implement various embodiments of the image processing method to perform image processing services for relevant users.

Figure 4:
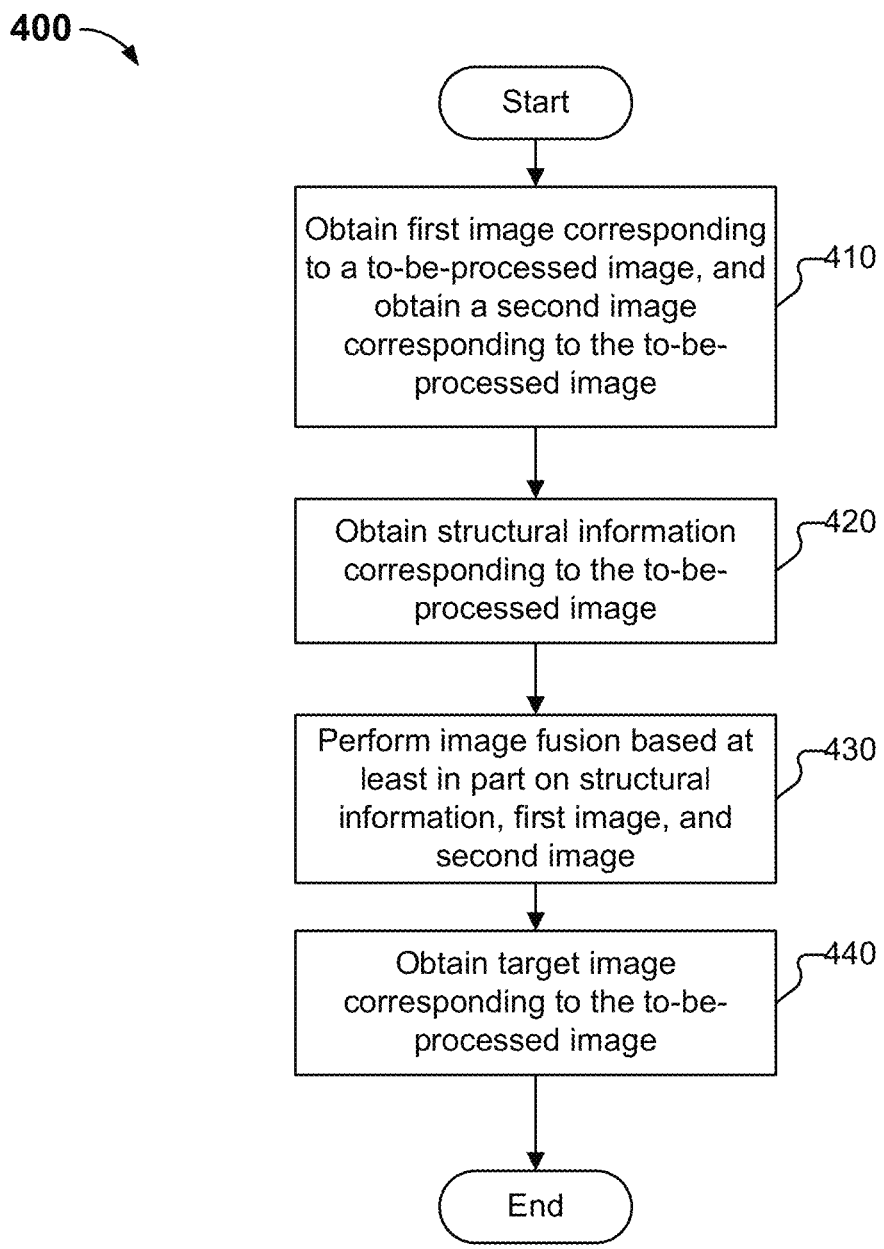
FIG. 4 is a flowchart of a method for image processing according to various embodiments of the present application.

FIG. 4 is a flowchart of a method for image processing according to various embodiments of the present application. According to various embodiments, process 400 of FIG. 4 may be implemented in connection with process 100 of FIG. 1.

Referring to FIG. 4, process 400 may be implemented by a terminal, a server, etc. For example, process 400 may be implemented by an image capturing device such as a mobile phone, a tablet, etc. As another example, process 400 may be implemented in connection with medical imaging (e.g., by a terminal or server associated with processing images captured by a medical device such as an x-ray, an magnetic resonance imaging (MM), etc.). As another example, process 400 may be implemented in connection with processing a satellite image, etc. Process 400 may be implemented in connection with other imaging/image capturing technologies.

At 410, a first image corresponding to a to-be-processed image is obtained, and a second image corresponding to the to-be-processed image is obtained. According to various embodiments, the first image and the second image are images obtained in response to processing the to-be-processed image based at least in part on an image degradation processing. In some embodiments, the image quality of the first image and the image quality of the second image are different.

The to-be-processed image (e.g., the source image) may be a pre-selected image used in image processing. In some embodiments, the to-be-processed image may be a video frame. Image degradation processing may be an image processing process whereby a high-quality image undergoes a series of processing steps to obtain a low-quality image corresponding to the high-quality image. In some embodiments, the steps for obtaining a first image corresponding to the to-be-processed image and obtaining a second image corresponding to the to-be-processed image include obtaining a to-be-processed image; determining the image quality of the first image, determining the image quality of the second image, performing image degradation processing with respect to the to-be-processed image based on the image quality of the first image to obtain the first image, and performing image degradation processing with respect to the to-be-processed image based on the image quality of the second image to obtain the second image. The high-quality images and low-quality images may images in relation to a specified image quality threshold. Images having an image quality that attains (e.g., is equal to or exceeds) the specified image quality threshold are deemed to be high-quality images, and images having an image quality fails to attain (e.g., that is less than) the specified image quality threshold are deemed to be low-quality images. Image quality is an evaluation of the visual effects of an image and is used to characterize the definition, resolution, and other aspects of an image.

In some embodiments, performing an image degradation processing with respect to-be-processed image to image degradation processing based at least in part on the image quality of the first image to obtain the first image comprises: adding interference information to the to-be-processed image based at least in apart on the image quality of the first image to obtain the first image. The performing the image degradation processing with respect the to-be-processed image based at least in part on the image quality of the first image to obtain the first image further comprises: removing effective information from the to-be-processed image based at least in part on the degree of degradation of the first image to obtain the first image. The manner in which interference information is added to the to-be-processed image may include: adding noise to the to-be-processed image. For example, the noise may be added to the to-be-processed image based at least in part on one or more noise functions, such as a white noise function (e.g., a Gaussian white noise function), a value noise function, a Perlin noise function, a layered noise function, a Voronoi noise function, a tiling noise function, etc. Various other noise functions may be implemented. The manner in which effective information is removed from the to-be-processed image includes changing the pixel values of some pixels in the to-be-processed image in order to lower the definition of some image regions.

At 420, image structural information corresponding to the to-be-processed image is obtained. According to various embodiments, the obtaining the image structural information comprises partitioning the to-be-processed image into multiple target image regions, and obtaining image structural information respectively corresponding to the multiple target image regions.

The image structural information corresponding to the to-be-processed image may correspond to an information set of image edge feature information of the to-be-processed image and image definition feature information of the image. The image structural information corresponding to multiple target image regions may correspond to the image structural information of the region images corresponding to a target image region after the to-be-processed processed image is partitioned into the specified multiple target image regions. For example, each target region (e.g., each partition) of the to-be-processed image, or of a predefined part of the to-be-processed image, may have a corresponding image structural information corresponding to multiple target image regions.

According to various embodiments, the obtaining image structural information corresponding to the multiple target image regions comprises: performing edge detection and blur detection on the to-be-processed image, obtaining image edge feature information corresponding to the multiple target image regions (e.g., in response to performing the edge detection and/or blur detection), and obtaining image definition feature information corresponding to the multiple target image regions. The obtaining image structural information corresponding to the multiple target image regions further comprises: in response to obtaining the image edge feature information and the image definition feature information, obtaining image structural information corresponding to the multiple target image regions based at least in part on (i) image edge feature information corresponding to the multiple target image regions, and (ii) image definition feature information corresponding to the multiple target image regions.

At 430, an image fusion is performed. In some embodiments, the performing the image fusion comprises: performing an image fusion processing with respect to the first image and the second image based at least in part on image structural information corresponding to the to-be-processed image. A target image corresponding to the to-be-processed image may be obtained based at least in part on the performing the image fusion processing with respect to the first image and the second image.

According to various embodiments, the obtaining the target image corresponding to the to-be-processed image comprises: obtaining target weights for characterizing image structural information corresponding to multiple target image regions; and performing the image fusion processing with respect to the first image and the second image based at least in part on the target weights, and obtaining a target image corresponding to the to-be-processed image based at least in part on performing the image fusion processing with respect to the first image and the second image (e.g., a result of the image fusion processing).

In some embodiments, the obtaining target weights comprises: (i) obtaining region weights based at least in part on the image edge feature information corresponding to each target image region of the multiple target image regions and the image definition feature information corresponding to each of the target image regions, and (ii) obtaining target weights based at least in part on the region weights. The obtained region weights may be used in connection with characterizing image structural information corresponding to each of the target image regions.

In some embodiments, the obtaining the region weights (e.g., for characterizing image structural information corresponding to each target image region) comprises (i) obtaining region edge feature values for characterizing image edge feature information corresponding to each target image region, (iii) obtaining region definition feature values for characterizing image definition feature information corresponding to each target image region, and (iii) determining the region weights based at least in part on the region edge feature values and the region definition feature values. The region edge feature values and the region definition feature values may be obtained serially in any order or in parallel.

The region edge feature values may correspond to feature values that are obtained after image edge feature information corresponding to multiple target region images undergoes unified value assignment. The region edge feature values may be used in connection with characterizing the degree of edginess of the multiple target region images in the to-be-processed image. In some embodiments, the greater the region edge feature value, the greater the extent to which the target region image corresponding to the region edge feature value is positioned at an edge in the to-be-processed image. In some embodiments, the smaller the region edge feature value, the greater the extent to which the target region image corresponding to the region edge feature value is positioned in the center of the to-be-processed image.

The region definition feature values for characterizing image definition feature information corresponding to each target image region may correspond to feature values that are obtained after image definition feature information corresponding to multiple target region images undergoes unified value assignment. The region definition feature values for characterizing image definition feature information corresponding to each target image region may be used in connection with characterizing the definitions of the multiple target images. In some embodiments, the greater the region definition feature value, the greater the extent of the definition of the target region image corresponding to the region definition feature value. In some embodiments, the smaller the region definition feature value, the lesser the extent of the definition of the target region image corresponding to the region definition feature value.

According to various embodiments, in connection with obtaining target weights based at least in part on region weights, the region edge feature values and the region definition feature values are used as a basis to determine an image edge feature value image corresponding to the multiple target image regions and to obtain an image definition feature value image corresponding to the multiple target image regions. The image edge feature value image and the image definition feature value image may be used as a basis to determine the target weights (e.g., in response to the image definition feature value image corresponding to the multiple target image regions being obtained). According to various embodiments, because the region edge feature values and region definition feature values correspond to each target image region, if the region edge feature values and region definition feature values may be used as a basis to determine image edge feature value images corresponding to multiple target image regions and to obtain image definition feature value images corresponding to the multiple target image regions, a feature value image that has the same dimensions as the to-be-processed image and that is partitioned into the same number of target regions may be generated.

According to various embodiments, determining the target weights based at least in part on an image edge feature value image and an image definition feature value image comprises: (i) determining an initial image structural weight image for characterizing image structural information corresponding to the multiple target image regions based at least in part on the image edge feature value image and the image definition feature value image; (ii) performing Gaussian blur calculations and image morphological calculations on the initial image structural weight image and obtaining a second image structural weight image for characterizing image structural information corresponding to the multiple target image regions; and (iii) performing normalization processing with respect to weights in the second image structural weight image, obtaining a target structural weight image for characterizing image structural information corresponding to the multiple target image regions, and deeming the weights in the target structural weight image to be the target weights.

According to various embodiments, the region edge feature values may correspond to feature values that are obtained in response to a unified value assignment being performed with respect to image edge feature information corresponding to multiple target region images. The region edge feature values may be used in connection with characterizing the degree of edginess of the multiple target region images in the to-be-processed image. As an example, the greater the region edge feature value, the greater the extent to which the target region image corresponding to the region edge feature value is positioned at an edge in the to-be-processed image. As an example, the smaller the region edge feature value, the greater the extent to which the target region image corresponding to the region edge feature value is positioned in the center of the to-be-processed image.

The "region definition feature values for characterizing image definition feature information corresponding to each target image region" may correspond to feature values that are obtained in response to performing a unified value assignment with respect to image definition feature information corresponding to multiple target region images undergoes unified value assignment. The region definition feature values may be used in connection with characterizing the definitions of the multiple target images. As an example, the greater the region definition feature value, the greater the definition of the target region image corresponding to the region definition feature value. As an example, the smaller the region definition feature value, the lower the definition of the target region image corresponding to the region definition feature value.

The Gaussian blur calculations may include convolutions performed on the initial structural value image with a normal distribution. The image morphological calculations may include expansion, corrosion, and other image processing performed on the initial structural weight image. Normalization may correspond to the normalization of weights in the second structural weight image to between 0 and 1.

Figure 5:
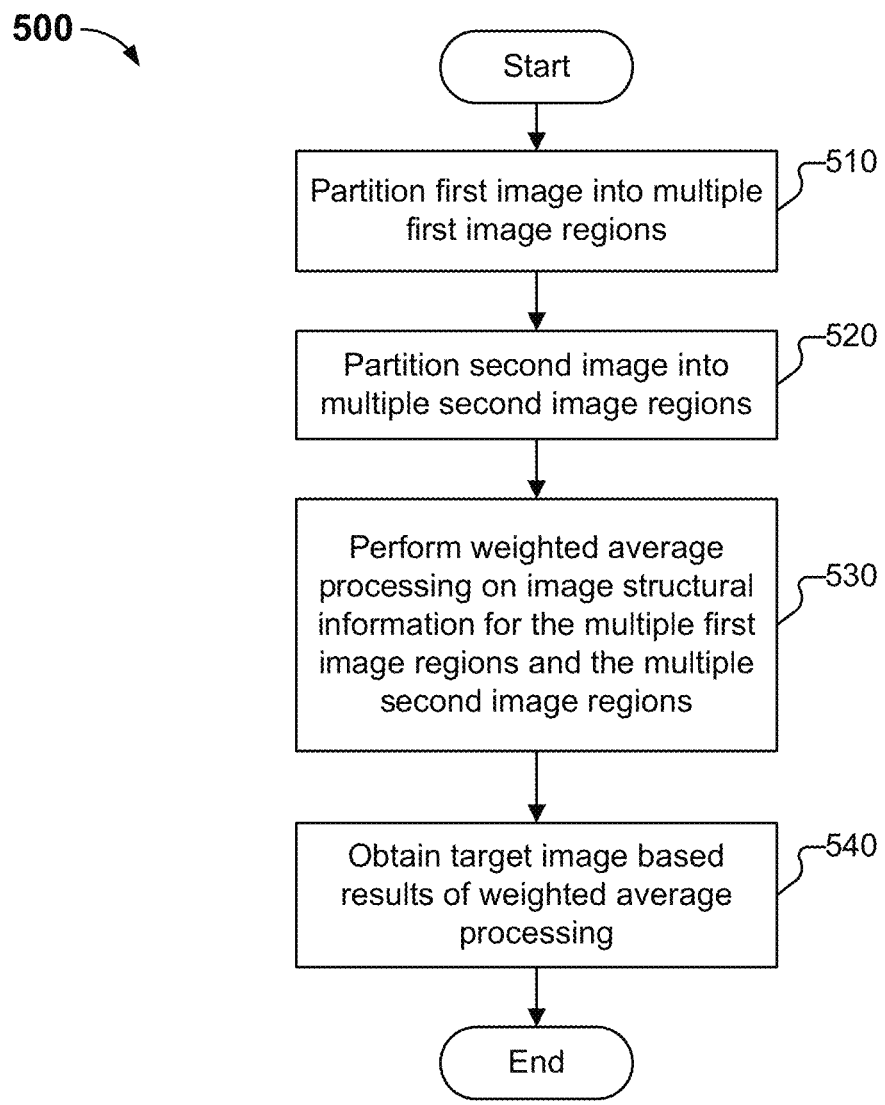
FIG. 5 is a flowchart of method for image fusion according to various embodiments of the present application.

FIG. 5 is a flowchart of method for image fusion according to various embodiments of the present application.

Referring to FIG. 5, process 500 may be implemented by a terminal, a server, etc. For example, process 500 may be implemented by an image capturing device such as a mobile phone, a tablet, etc. As another example, process 500 may be implemented in connection with medical imaging (e.g., by a terminal or server associated with processing images captured by a medical device such as an x-ray, an magnetic resonance imaging (MM), etc.). As another example, process 500 may be implemented in connection with processing a satellite image, etc. Process 500 may be implemented in connection with other imaging/image capturing technologies.

According to various embodiments, process 500 may be implemented in connection with the performing an image fusion with respect to the first image and the second image. For example, process 500 may be implemented in connection with the performing an image fusion with respect to the first image and the second image based at least in part on the target weights. Process 500 may be implemented in connection with process 400 of FIG. 4. For example, process 500 may be implemented to perform an image fusion process using target weights obtained/determined based at least in part on process 400.

At 510, the first image is partitioned into multiple first image regions. In some embodiments, the first image is partitioned into multiple first image regions based at least in part on the multiple target image regions. In response to the partitioning of the first image, multiple first image regions are obtained that respectively correspond to the multiple target image regions.

At 520, the second image is partitioned into multiple second image regions. In some embodiments, the second image is partitioned into multiple second image regions based at least in part on the multiple target image regions. In response to the partitioning of the second image, multiple second image regions are obtained that respectively correspond to the multiple target image regions.

At 530, a weighted average processing is performed with respect to image structural information for the multiple first image regions and the multiple second image regions. According to various embodiments, the weighted average processing of the image structural information for the multiple first image regions and image structural information for the multiple second image regions is based at least in part on the target weights. In response to performing the weighted average processing based at least in part on the target weights, the target image is obtained.

According to various embodiments, the image processing comprises obtain a first image and a second image which respectively correspond to the to-be-processed image and that have different image qualities; obtain image structural information corresponding to the to-be-processed image, and obtained a target image based at least on performing an image fusion with respect to the first image and the second image to fusion processing based at least on the image structural information corresponding to the to-be-processed image. According to the image processing method, the first image and the second image (e.g., which vary as to quality and intensity) are fused self-adaptively based on the image structural information corresponding to the to-be-processed image in the process of generating the target image. The use of the image structural image in connection with the fusion processing of the first image and the second image may ensure a diversity of image structural information and image quality between different target images, and may correspondingly avoid the problem of poor fidelity of target images that results from the relatively unvaried image structural information and image quality between different target images which occurs when an overall, unified approach is adopted to generate images.

According to various embodiments, after the target image is obtained, sample to-be-processed images may be obtained for training an image quality enhancement model. Moreover, the sample to-be-processed image and the target image may serve as input for training the image quality enhancement model. The image quality enhancement model may be a model used to perform image quality enhancement processing.

Because the fidelity of the target image, obtained according to various embodiments, is relatively high, and the image structural information is relatively diverse, the use of sample to-be-processed images and target images as input to train the image quality enhancement model can improve the generalizability and effectiveness of the trained image quality enhancement model.

Figure 6:
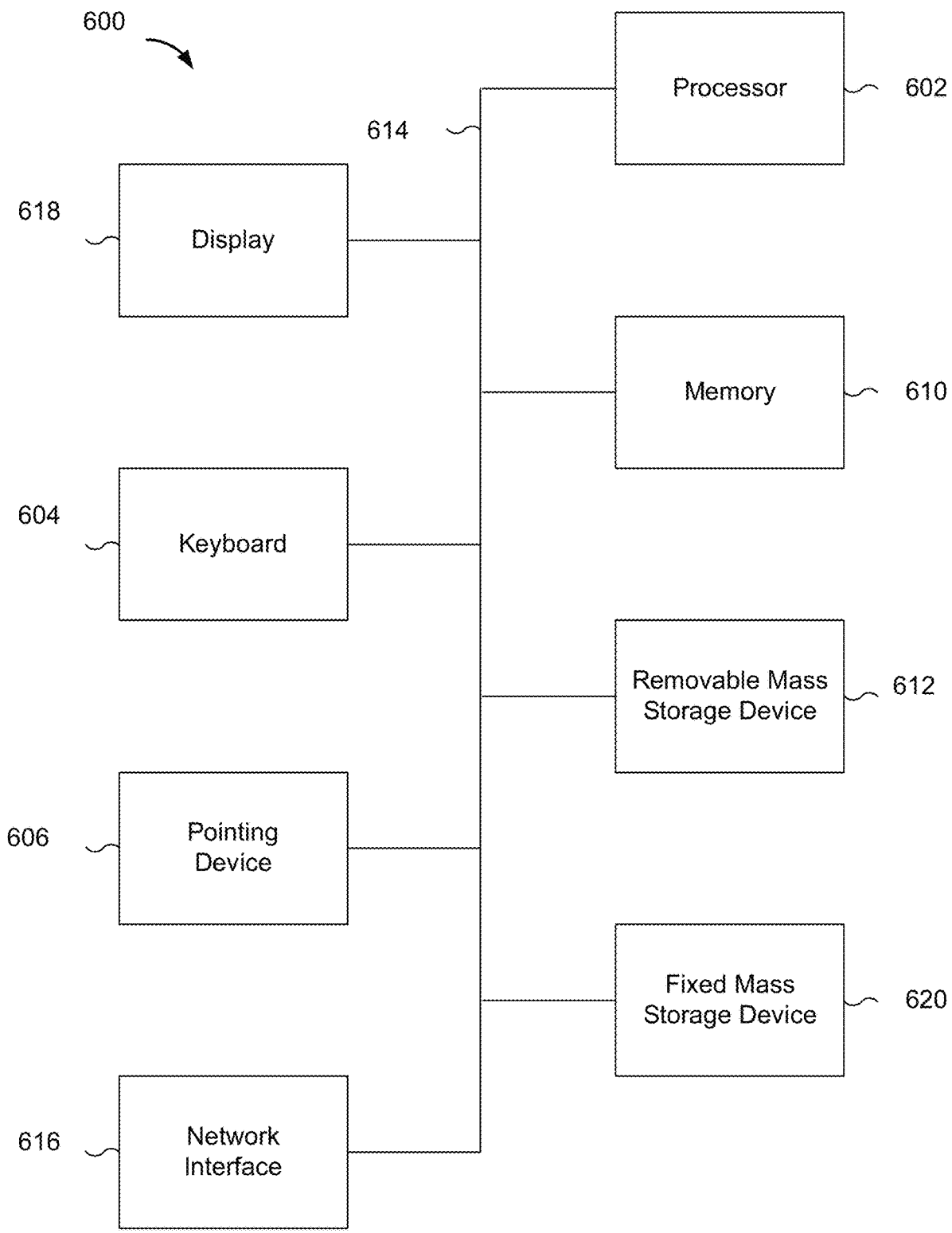
FIG. 6 is a functional diagram of a computer system according to various embodiments of the present application.

FIG. 6 is a functional diagram of a computer system according to various embodiments of the present application.

Computer system 600 may implement process 100 of FIG. 1, process 200 of FIG. 2, process 300 of FIG. 3, process 400 of FIG. 4, and/or process 500 of FIG. 5.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Each of the embodiments contained in this specification is described in a progressive manner. The explanation of each embodiment focuses on areas of difference from the other embodiments, and the descriptions thereof may be mutually referenced regarding portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, an embodiment of the present application may take the form of one or more computer program products implemented on computer-usable storage media (including but not limited to magnetic disk memory, CD-ROM, and optical memory) containing computer-usable program code.

The memory in each of the embodiments described above may take the form of any type of volatile or non-volatile storage device or combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disks, or optical disks.

Computer system 600 may comprise a communication interface and/or commination component. The communication component may be configured to facilitate wired or wireless communication between the device on which the communication component is located (e.g., computer system 600) and other devices (e.g., an access point or a terminal connected to a network, etc.). The device on which the communication component is located (e.g., computer system 600) may access wireless networks based on a communications standard such as WiFi, 2G, 3G, 4G/LTE, 5G, or another mobile communications network or a combination thereof. In an exemplary embodiment, the communication component receives via broadcast channels broadcast signals or broadcast-related information from external broadcast management systems. In some embodiments, the communication component further comprises a near-field communication (NFC) module for promoting short-range communication. For example, communication can be achieved in the NFC module on the basis of radio-frequency identification (RFID) technology, Infrared Data Association (IrDA) technology, ultra-wide band (UWB) technology, Bluetooth (BT) technology, and other technology.

The display in each of the embodiments described above comprises a screen, and the screen may comprise a liquid crystal display (LCD) or touch panel (TP). If the screen comprises a touch panel, the screen may be implemented as a touchscreen to receive input signals from the user. The touch panel comprises one or more touch sensors to detect touch, swipe actions, and gestures on the touch panel. Said touch sensor not only can detect the boundaries of touch or swipe actions, but also can measure the duration and pressure related to said touch or swipe operations.

The power supply component in each of the embodiment described above is for providing electric power to all components in the device where the power supply component is located. The power supply component may include a power supply management system, one or more power supplies, and other components related to generating, managing, and allocating power to the device where the power supply component is located.

The audio component in each of the embodiments described above may be configured to output and/or input audio signals. For example, the audio component includes a microphone (MIC). When the device where the audio component is located is in an operating mode, e.g., when in calling mode, recording mode, or speech recognition mode, the microphone is configured to receive external audio signals. The received audio signals may be further stored in memory or sent by the communication component. In some embodiments, the audio component further comprises a speaker for outputting audio signals.

A person skilled in the art should understand that the embodiment of the present application can be provided as methods, systems or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program code.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be implemented by computer instructions. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

Please also note that the term "comprise" or "contain" or any of their variants are to be taken in their non-exclusive sense. Thus, processes, methods, merchandise, or devices that comprise a series of elements comprise not only those elements, but also other elements that have not been explicitly listed or those that are intrinsic to such processes, methods, merchandise, or devices. In the absence of further limitations, elements that are limited by the phrase "comprises a(n) . . . " do not exclude the existence of additional identical elements in the processes, methods, merchandise, or devices that comprise said elements.

The above-stated are merely embodiments of the present application and do not limit the present application. For a person skilled in the art, there may be various modifications and alterations of the present application. Any revision, equivalent substitution, or improvement done within the spirit and principles of the present application shall be included within the scope of claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
obtaining, by one or more processors, a first image corresponding to a to-be-processed image and a second image corresponding to the to-be-processed image, wherein:
the first image and the second image are obtained in response to an image degradation processing being performed with respect to the to-be-processed image;
an image quality of the first image and an image quality of the second image are different; and
obtaining the first image and the second image comprises:
obtaining the to-be-processed image;
determining the image quality of the first image;
determining the image quality of the second image;
performing a first image degradation processing with respect to to-be-processed image based at least in part on the image quality of the first image to obtain the first image; and
performing a second image degradation processing with respect to the to-be-processed image based at least in part on the image quality of the second image to obtain the second image;
obtaining, by the one or more processors, image structural information corresponding to the to-be-processed image; and
performing, by the one or more processors, an image fusion processing with respect to the first image and the second image to image fusion based at least in part on the image structural information corresponding to the to-be-processed image, wherein:

a target image is obtained based at least in part on the image fusion processing, and the target image corresponds to the to-be-processed image.

2. The method of claim 1, wherein the obtaining image structural information corresponding to the to-be-processed image comprises:

partitioning the to-be-processed image into multiple target image regions; and obtaining image structural information corresponding to the multiple target image regions.

3. The method of claim 2, wherein the performing the image fusion processing with respect to the first image and the second image to image fusion processing based at least in part on the image structural information corresponding to said to-be-processed image comprises:

obtaining one or more target weights for characterizing the image structural information corresponding to the multiple target image regions; and using the target weights in connection with performing the image fusion processing with respect to the first image and the second image to image; and obtaining a target image corresponding to the to-be-processed image, the target image being obtained based at least in part on a result of the image fusion processing.

4. The method of claim 3, wherein the obtaining the one or more target weights for characterizing the image structural information corresponding to the multiple target image regions comprises:

using image edge feature information corresponding to a plurality of target image regions and image definition feature information corresponding to the plurality of target image regions as a basis to obtain region weights for characterizing image structural information corresponding to the plurality of target image regions; and obtaining the one or more target weights based at least in part on the region weights.

5. The method of claim 4, wherein the region weights for characterizing image structural information is obtained for each target image region of the multiple target image regions.

6. The method of claim 4, wherein to obtain region weights for characterizing image structural information corresponding to the plurality of target image regions comprises:

obtaining region edge feature values for characterizing image edge feature information corresponding to each target image region of the multiple target image regions;

obtaining region definition feature values for characterizing image definition feature information corresponding to each target image region of the multiple target image regions; and determining the region weights based at least in part on the region edge feature values and the region definition feature values.

7. The method of claim 6, wherein the obtaining the target weights based at least in part on the region weights comprises:

determining an image edge feature value image corresponding to said multiple target image regions based at least in part on one or more of the region edge feature values and the region definition feature values;

obtaining an image definition feature value image corresponding to the multiple target image regions based at least in part on one or more of the region edge feature values and the region definition feature values; and determining the target weights based at least in part on the image edge feature value image and the image definition feature value image.

8. The method of claim 7, wherein the determining the target weights based at least in part on the image edge feature value image and the image definition feature value image comprises:

determining an initial image structural weight image for characterizing image structural information corresponding to the multiple target image regions based at least in part on the image edge feature value image and the image definition feature value image;

performing Gaussian blur processing and image morphological processing on the initial image structural weight image and obtaining a second image structural weight image for characterizing image structural information corresponding to the multiple target image regions; and performing a normalization processing on weights in the second image structural weight image, obtaining a target structural weight image for characterizing image structural information corresponding to the multiple target image regions, and deeming the weights in the target structural weight image as the target weights.

9. The method of claim 2, wherein the obtaining image structural information corresponding to the multiple target image regions comprises:

performing an edge detection and a blur detection on the to-be-processed image;

obtaining image edge feature information corresponding to the multiple target image regions, the image edge feature information being obtained based at least in part on one or more of the edge detection and the blur detection;

obtaining image definition feature information corresponding to the multiple target image regions, the image definition feature information being obtained based at least in part on one or more of the edge detection and the blur detection; and obtaining image structural information corresponding to the multiple target image regions, the image structural information being obtained based at least in part on the image edge feature information corresponding to the multiple target image regions and the image definition feature information corresponding to the multiple target image regions.

10. The method of claim 2, wherein the performing the image fusion processing with respect to the first image and the second image to image fusion processing based at least in part on the image structural information corresponding to said to-be-processed image comprises:

using the multiple target image regions as a basis to partition the first image into multiple first image regions corresponding to the multiple target image regions and to partition the second image into multiple second image regions corresponding to the multiple target image regions;

obtaining one or more target weights for characterizing the image structural information corresponding to the multiple target image regions;

using the target weights in connection with performing the weighted average processing with respect to the image structural information corresponding to the multiple first image regions and image structural information corresponding to the multiple second image regions; and obtaining a target image corresponding to the to-be-processed image, the target image being obtained based at least in part on a result of the weighted average processing.

11. The method of claim 1, wherein the performing the image degradation processing with respect to the to-be-processed image based at least in part on the image quality of the first image to obtain the first image comprises: adding interference information to the to-be-processed image based at least in part on the image quality of the first image to obtain the first image.

12. The method of claim 1, wherein the performing the image degradation processing with respect to the to-be-processed image based at least in part on the image quality of the first image to obtain the first image comprises: removing effective information from the to-be-processed image based at least in part on a degree of degradation of the first image to obtain the first image.

13. The method of claim 1, further comprising:
obtaining a sample to-be-processed image for training an image quality enhancement model, wherein the image quality enhancement model is a model used to perform image quality enhancement processing; and
using the sample to-be-processed image and the target image as input for the image quality enhancement model in connection with training the image quality enhancement model.

14. A device, comprising:
one or more processors; and
a memory, for storing a program for image processing methods, wherein in response to execution program, the one or more processors are caused to:
  obtain a first image corresponding to a to-be-processed image and a second image corresponding to the to-be-processed image, wherein:
    the first image and the second image are obtained in response to an image degradation processing being performed with respect to the to-be-processed image;
    an image quality of the first image and an image quality of the second image are different; and
    obtaining the first image and the second image comprises:
      obtaining the to-be-processed image;
      determining the image quality of the first image;
      determining the image quality of the second image;
      performing a first image degradation processing with respect to to-be-processed image based at least in part on the image quality of the first image to obtain the first image; and
      performing a second image degradation processing with respect to the to-be-processed image based at least in part on the image quality of the second image to obtain the second image;
  obtain image structural information corresponding to the to-be-processed image; and
  perform an image fusion processing with respect to the first image and the second image to image fusion based at least in part on the image structural information corresponding to the to-be-processed image, wherein:
    a target image is obtained based at least in part on the image fusion processing, and
    the target image corresponds to the to-be-processed image.

15. A computer program product, the computer program product being embodied in a non-transitory computer readable storage medium and comprising computer instructions for:
obtaining, by one or more processors, a first image corresponding to a to-be-processed image and a second image corresponding to the to-be-processed image, wherein:
  the first image and the second image are obtained in response to an image degradation processing being performed with respect to the to-be-processed image;
  an image quality of the first image and an image quality of the second image are different; and
  obtaining the first image and the second image comprises:
    obtaining the to-be-processed image;
    determining the image quality of the first image;
    determining the image quality of the second image;
    performing a first image degradation processing with respect to to-be-processed image based at least in part on the image quality of the first image to obtain the first image; and
    performing a second image degradation processing with respect to the to-be-processed image based at least in part on the image quality of the second image to obtain the second image;
obtaining, by the one or more processors, image structural information corresponding to the to-be-processed image; and
performing, by the one or more processors, an image fusion processing with respect to the first image and the second image to image fusion based at least in part on the image structural information corresponding to the to-be-processed image, wherein:
  a target image is obtained based at least in part on the image fusion processing, and
  the target image corresponds to the to-be-processed image.

16. A method, comprising:
obtaining, by one or more processors, a first image corresponding to a to-be-processed image;
obtaining a second image corresponding to the to-be-processed image, wherein:
  the first image and the second image are obtained in response to an image degradation processing being performed with respect to the to-be-processed image, and
  an image quality of the first image and an image quality of the second image are different;
obtaining, by the one or more processors, image structural information corresponding to the to-be-processed image, wherein the obtaining image structural information corresponding to the to-be-processed image comprises:
  partitioning the to-be-processed image into multiple target image regions; and
  obtaining image structural information corresponding to the multiple target image regions; and
performing, by the one or more processors, an image fusion processing with respect to the first image and the second image to image fusion based at least in part on the image structural information corresponding to the to-be-processed image, wherein:
  a target image is obtained based at least in part on the image fusion processing;

the target image corresponds to the to-be-processed image;
the performing the image fusion processing with respect to the first image and the second image to image fusion processing based at least in part on the image structural information corresponding to said to-be-processed image comprises:
obtaining one or more target weights for characterizing the image structural information corresponding to the multiple target image regions; and
using the target weights in connection with performing the image fusion processing with respect to the first image and the second image to image; and
obtaining a target image corresponding to the to-be-processed image, the target image being obtained based at least in part on a result of the image fusion processing
the obtaining the one or more target weights for characterizing the image structural information corresponding to the multiple target image regions comprises:
using image edge feature information corresponding to a plurality of target image regions and image definition feature information corresponding to the plurality of target image regions as a basis to obtain region weights for characterizing image structural information corresponding to the plurality of target image regions; and
obtaining the one or more target weights based at least in part on the region weights, the obtaining the one or more target weights based at least in part on the region weights comprising:
obtaining region edge feature values for characterizing image edge feature information corresponding to each target image region of the multiple target image regions;
obtaining region definition feature values for characterizing image definition feature information corresponding to each target image region of the multiple target image regions; and
determining the region weights based at least in part on the region edge feature values and the region definition feature values.

17. A method, comprising:
obtaining, by one or more processors, a first image corresponding to a to-be-processed image;
obtaining a second image corresponding to the to-be-processed image, wherein:
the first image and the second image are obtained in response to an image degradation processing being performed with respect to the to-be-processed image, and
an image quality of the first image and an image quality of the second image are different;
obtaining, by the one or more processors, image structural information corresponding to the to-be-processed image, wherein the obtaining image structural information corresponding to the to-be-processed image comprises:
partitioning the to-be-processed image into multiple target image regions; and
performing an edge detection and a blur detection on the to-be-processed image;
obtaining image edge feature information corresponding to the multiple target image regions, the image edge feature information being obtained based at least in part on one or more of the edge detection and the blur detection;
obtaining image definition feature information corresponding to the multiple target image regions, the image definition feature information being obtained based at least in part on one or more of the edge detection and the blur detection; and
obtaining image structural information corresponding to the multiple target image regions, the image structural information being obtained based at least in part on the image edge feature information corresponding to the multiple target image regions and the image definition feature information corresponding to the multiple target image regions; and
performing, by the one or more processors, an image fusion processing with respect to the first image and the second image to image fusion based at least in part on the image structural information corresponding to the to-be-processed image, wherein:
a target image is obtained based at least in part on the image fusion processing, and
the target image corresponds to the to-be-processed image.

18. A method, comprising:
obtaining a sample to-be-processed image for training an image quality enhancement model, wherein the image quality enhancement model is a model used to perform image quality enhancement processing;
using the sample to-be-processed image and the target image as input for the image quality enhancement model in connection with training the image quality enhancement model;
using the image quality enhancement model to process a to-be-processed image, comprising:
obtaining, by one or more processors, a first image corresponding to the to-be-processed image;
obtaining a second image corresponding to the to-be-processed image, wherein:
the first image and the second image are obtained in response to an image degradation processing being performed with respect to the to-be-processed image, and
an image quality of the first image and an image quality of the second image are different;
obtaining, by the one or more processors, image structural information corresponding to the to-be-processed image; and
performing, by the one or more processors, an image fusion processing with respect to the first image and the second image to image fusion based at least in part on the image structural information corresponding to the to-be-processed image, wherein:
a target image is obtained based at least in part on the image fusion processing, and
the target image corresponds to the to-be-processed image.

* * * * *